(12) United States Patent
Huang et al.

(10) Patent No.: US 12,198,659 B2
(45) Date of Patent: Jan. 14, 2025

(54) METHOD FOR ADJUSTING DISPLAY ATTRIBUTE, AND RELATED DEVICE

(71) Applicant: Huawei Technologies Co., Ltd., Shenzhen (CN)

(72) Inventors: Liwei Huang, Shenzhen (CN); Mengdi Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/622,542

(22) PCT Filed: Jun. 24, 2020

(86) PCT No.: PCT/CN2020/097829
§ 371 (c)(1),
(2) Date: Dec. 23, 2021

(87) PCT Pub. No.: WO2020/259517
PCT Pub. Date: Dec. 30, 2020

(65) Prior Publication Data
US 2022/0398997 A1 Dec. 15, 2022

(30) Foreign Application Priority Data
Jun. 27, 2019 (CN) .......................... 201910568981.2

(51) Int. Cl.
*G09G 5/30* (2006.01)
*G06F 3/147* (2006.01)
*G09G 5/02* (2006.01)

(52) U.S. Cl.
CPC .............. *G09G 5/30* (2013.01); *G06F 3/147* (2013.01); *G09G 5/02* (2013.01);
(Continued)

(58) Field of Classification Search
CPC ............ G09G 5/30; G09G 2320/0606; G09G 2320/066; G09G 2320/0686;
(Continued)

(56) References Cited

U.S. PATENT DOCUMENTS 7,002,593 B2 * 2/2006 Milch .................. G09G 3/3208
345/589
9,858,895 B2 1/2018 Li et al.
(Continued)

FOREIGN PATENT DOCUMENTS

| CN | 1933541 A | 3/2007 |
|---|---|---|
| CN | 101243487 A | 8/2008 |

(Continued)

OTHER PUBLICATIONS

Tony Leung, "Visually Lossless Compression of Windowed Images," 2013, Data Compression Conference, 1 pages.
(Continued)

*Primary Examiner* — Antonio A Caschera

(57) ABSTRACT

A method for adjusting a display attribute, and a related device, to make a display effect of an element on a page more prominent. The method includes obtaining a first luminance and a second luminance on a page, where the first luminance is a luminance of an element on the page, and the second luminance is a luminance of a background region in which the element is displayed; determining a first contrast ratio between the element and the background region based on the first luminance and the second luminance; and adjusting a display attribute of the element when the first contrast ratio is less than a preset contrast ratio.

23 Claims, 7 Drawing Sheets

(52) U.S. Cl.
CPC .............. *G09G 2320/0606* (2013.01); *G09G 2320/066* (2013.01); *G09G 2320/0686* (2013.01); *G09G 2320/08* (2013.01)

(58) Field of Classification Search
CPC ............. G09G 2320/08; H04N 21/431; H04N 21/4312; G06F 3/048; G06T 2200/24
See application file for complete search history.

(56) References Cited

U.S. PATENT DOCUMENTS

| | | |
|---|---|---|
| 2003/0076326 A1 | 4/2003 | Tezuka et al. |
| 2007/0065012 A1 | 3/2007 | Yamakado et al. |
| 2010/0201709 A1 | 8/2010 | Yang et al. |
| 2011/0115807 A1 | 5/2011 | Kim |
| 2011/0208389 A1 | 8/2011 | Tarte |
| 2014/0085524 A1 | 3/2014 | Berglund et al. |
| 2014/0368525 A1 | 12/2014 | Faaborg et al. |
| 2015/0091934 A1 | 4/2015 | Jung et al. |
| 2016/0246475 A1 | 8/2016 | Garcia et al. |
| 2018/0150978 A1 | 5/2018 | Li |
| 2019/0172419 A1 | 6/2019 | Hwang et al. |

FOREIGN PATENT DOCUMENTS

| | | | |
|---|---|---|---|
| CN | 102567300 A | 7/2012 | |
| CN | 103137103 A | 6/2013 | |
| CN | 104778047 A | 7/2015 | |
| CN | 105005461 A | 10/2015 | |
| CN | 105159874 A | 12/2015 | |
| CN | 105204807 A | 12/2015 | |
| CN | 105824496 A | 8/2016 | |
| CN | 105912321 A | 8/2016 | |
| CN | 105957125 A | 9/2016 | |
| CN | 106775548 A | 5/2017 | |
| CN | 107016978 A | 8/2017 | |
| CN | 107527374 A | 12/2017 | |
| CN | 109189281 A | 1/2019 | |
| CN | 110442313 A | 11/2019 | |
| EP | 2770403 A1 | 8/2014 | |
| EP | 3174306 A1 | 5/2017 | |
| EP | 3968141 A1 | 6/2020 | |
| JP | H02264298 A | 10/1990 | |
| JP | 2002140044 A | 5/2002 | |
| KR | 20150033786 A | 4/2015 | |
| WO | 2015180035 A1 | 12/2015 | |
| WO | WO-2016066250 A1 * | 5/2016 | ............. G06F 3/048 |
| WO | 2018012926 A1 | 1/2018 | |
| WO | 2018204030 A1 | 11/2018 | |

OTHER PUBLICATIONS

Zhang Qi, "Application of Visual Communication Design in History Classroom Teaching," Master's Thesis: Yangzhou University, Jun. 2016, with an English Abstract, total 80 pages.
Chen yawen, Comparison and Optimization in Digital Reading Interface Visual Design, Sep. 2018, 4 pages.

* cited by examiner

METHOD FOR ADJUSTING DISPLAY ATTRIBUTE, AND RELATED DEVICE

CROSS-REFERENCE TO RELATED APPLICATIONS

This is a U.S. National Stage of International Patent Application No. PCT/CN2020/097829 filed on Jun. 24, 2020, which claims priority to Chinese Patent Application No. 201910568981.2 filed on Jun. 27, 2019, both of which are hereby incorporated by reference in their entireties.

TECHNICAL FIELD

Embodiments of this application relate to the field of terminal devices, and in particular, to a method for adjusting a display attribute, and a related device.

BACKGROUND

A contrast ratio refers to a range of differences in different brightness levels between brightest white and darkest black in bright and dark regions in an image. Generally, a smaller range of differences indicates a smaller contrast ratio.

In a conventional technology, a display attribute of an element displayed by a terminal device on a page is relatively independent of a display attribute of a background region in which the element is displayed. In this solution, when the display attribute of the background region in which the element is displayed on the page changes, a contrast ratio between the element and the background region may be decreased. Consequently, a display effect of the element in the background may be not prominent, which may deteriorate reading experience of a user.

SUMMARY

Embodiments of this application provide a method for adjusting a display attribute, and a related device, to make a display effect of an element on a page more prominent, thereby improving reading experience of a user.

According to a first aspect, an embodiment of this application provides a method for adjusting a display attribute, including: A terminal device obtains a first luminance and a second luminance on a page, where the first luminance is a luminance of an element on the page, and the second luminance is a luminance of a background region in which the element is displayed. Then, the terminal device determines a first contrast ratio between the element and the background region based on the first luminance and the second luminance, and adjusts a display attribute of the element when the first contrast ratio is less than a preset contrast ratio.

In this embodiment of this application, the terminal device may determine the first contrast ratio between the element and the background region based on the luminance of the element and the luminance of the background region, and adjust the display attribute of the element when the first contrast ratio is less than the preset contrast ratio. Therefore, the display attribute of the element may vary with a display attribute of the background region of the element, so that a probability that a display effect of the element in the background is not prominent due to a decrease in the contrast ratio between the element and the background region may be reduced, thereby improving reading experience of a user.

According to the first aspect, in a first implementation of the first aspect of the embodiments of this application, the element includes a text or an icon.

In this implementation, a specific implementation of the element is specified, which may be a text or may be an icon.

According to the first implementation of the first aspect, in a second implementation of the first aspect of the embodiments of this application, the display attribute of the element includes a line thickness value of the element.

In this implementation, the display attribute of the element is specified. The terminal device may adjust the line thickness value of the element, so that the element can be displayed on the page relatively prominently.

According to the second implementation of the first aspect, in a third implementation of the first aspect of the embodiments of this application, the adjusting a display attribute of the element includes: adjusting the line thickness value of the element based on a preset correspondence and the first contrast ratio, where the preset correspondence is a correspondence between the first contrast ratio and the line thickness value of the element.

In this implementation, a specific implementation of adjusting the line thickness value is specified. The terminal device may adjust the line thickness value based on the first contrast ratio, so that the element corresponding to the adjusted line thickness value can be prominently displayed on the page, thereby improving reading experience of a user.

According to the second implementation of the first aspect or the third implementation of the first aspect, in a fourth implementation of the first aspect of the embodiments of this application, the display attribute of the element further includes the luminance of the element; and when the first contrast ratio is less than the preset contrast ratio, the method further includes: adjusting the luminance of the element to a first target luminance, where a second contrast ratio between the first target luminance and the luminance of the background region is greater than the preset contrast ratio.

In this implementation, in addition to adjusting the line thickness value of the element, the terminal device may further adjust the first luminance, that is, adjust the luminance of the element, so that a line of the element can become brighter or darker while becoming thicker.

According to the first aspect or any implementation in the first implementation to the fourth implementation of the first aspect, in a fifth implementation of the first aspect of the embodiments of this application, the display attribute of the element further includes a shadow of the element; and when the first contrast ratio is less than the preset contrast ratio, the method further includes: setting the shadow of the element, where a color of the shadow is different from that of the element.

In this implementation, in addition to adjusting the line thickness value of the element and the luminance of the element, the terminal device may further set the shadow for the element, so that the element can be prominently displayed on the page, thereby improving reading experience of a user.

According to the first aspect or any implementation in the first implementation to the fourth implementation of the first aspect, in a sixth implementation of the first aspect of the embodiments of this application, when the first contrast ratio is less than the preset contrast ratio, the method further includes: adjusting the luminance of the background region to a second target luminance, where a third contrast ratio between the second target luminance and the luminance of the element is greater than the preset contrast ratio.

In this implementation, in addition to adjusting the line thickness value of the element and the luminance of the element, and setting the shadow, the terminal device may further adjust the luminance of the background region, so that the element can be prominently displayed on the page, thereby improving reading experience of a user.

According to a second aspect, an embodiment of this application provides a terminal device, including: an obtaining module, configured to obtain a first luminance and a second luminance on a page, where the first luminance is a luminance of an element on the page, and the second luminance is a luminance of a background region in which the element is displayed; a determining module, configured to determine a first contrast ratio between the element and the background region based on the first luminance and the second luminance; and an adjustment module, configured to adjust a display attribute of the element when the first contrast ratio is less than a preset contrast ratio.

In this embodiment of this application, the terminal device may determine the first contrast ratio between the element and the background region based on the luminance of the element and the luminance of the background region, and adjust the display attribute of the element when the first contrast ratio is less than the preset contrast ratio. Therefore, the display attribute of the element may vary with a display attribute of the background region of the element, so that a probability that a display effect of the element in the background is not prominent due to a decrease in the contrast ratio between the element and the background region may be reduced, thereby improving reading experience of a user.

According to the second aspect, in a first implementation of the second aspect of the embodiments of this application, the element includes a text or an icon.

In this implementation, a specific implementation of the element is specified, which may be a text or may be an icon.

According to the first implementation of the second aspect, in a second implementation of the second aspect of the embodiments of this application, the display attribute of the element includes a line thickness value of the element.

In this implementation, the display attribute of the element is specified. The terminal device may adjust the line thickness value of the element, so that the element can be displayed on the page relatively prominently.

According to the second implementation of the second aspect, in a third implementation of the second aspect of the embodiments of this application, the adjustment module is specifically configured to adjust the line thickness value of the element based on a preset correspondence and the first contrast ratio, where the preset correspondence is a correspondence between the first contrast ratio and the line thickness value of the element.

In this implementation, a specific implementation of adjusting the line thickness value is specified. The terminal device may adjust the line thickness value based on the first contrast ratio, so that the element corresponding to the adjusted line thickness value can be prominently displayed on the page, thereby improving reading experience of a user.

According to the second implementation of the second aspect or the third implementation of the second aspect, in a fourth implementation of the second aspect of the embodiments of this application, the display attribute of the element further includes the luminance of the element; and the adjustment module is further configured to adjust the luminance of the element to a first target luminance, where a second contrast ratio between the first target luminance and the luminance of the background region is greater than the preset contrast ratio.

In this implementation, in addition to adjusting the line thickness value of the element, the terminal device may further adjust the first luminance, that is, adjust the luminance of the element, so that a line of the element can become brighter or darker while becoming thicker.

According to the second aspect or any implementation in the first implementation to the fourth implementation of the second aspect, in a fifth implementation of the second aspect of the embodiments of this application, the display attribute of the element further includes a shadow of the element; and the adjustment module is further configured to set the shadow of the element, where a color of the shadow is different from that of the element.

In this implementation, in addition to adjusting the line thickness value of the element and the luminance of the element, the terminal device may further set the shadow for the element, so that the element can be prominently displayed on the page, thereby improving reading experience of a user.

According to the second aspect or any implementation in the first implementation to the fourth implementation of the second aspect, in a sixth implementation of the second aspect of the embodiments of this application, the adjustment module is further configured to adjust the luminance of the background region to a second target luminance, where a third contrast ratio between the second target luminance and the luminance of the element is greater than the preset contrast ratio.

In this implementation, in addition to adjusting the line thickness value of the element and the luminance of the element, and setting the shadow, the terminal device may further adjust the luminance of the background region, so that the element can be prominently displayed on the page, thereby improving reading experience of a user.

According to a third aspect, an embodiment of this application provides a terminal device. The terminal device may be a mobile terminal device including a display apparatus, or may be a chip in the mobile terminal device. The terminal device may include a processing module and a transceiver module. When the terminal device is a mobile terminal device including a display apparatus, the processing module may be a processor. The terminal device may further include a storage module, and the storage module may be a memory. The storage module is configured to store instructions. The processing module executes the instructions stored in the storage module, so that the terminal device performs the method in the first aspect or any implementation of the first aspect. When the communications device is the chip in the terminal device, the processing module may be a processor, and the transceiver module may be an input/output interface, a pin, a circuit, or the like. The processing module executes the instructions stored in the storage module, so that the internet of vehicles terminal device performs the method in the first aspect or any implementation of the first aspect. The storage module may be a storage module (for example, a register or a cache) in the chip, or may be a storage module that is located outside the chip and that is in the internet of vehicles terminal device (for example, a read-only memory or a random access memory).

According to a fourth aspect, an embodiment of this application provides a computer program product including instructions. When the computer program product runs on a computer, the computer is enabled to perform the method in the first aspect or any implementation of the first aspect.

According to a fifth aspect, an embodiment of this application provides a computer-readable storage medium, including instructions. When the instructions are run on a computer, the computer is enabled to perform the method in the first aspect or any implementation of the first aspect, or the method in the second aspect or any implementation of the second aspect.

It can be learned from the foregoing technical solutions that the embodiments of this application have the following advantages:

In the embodiments of this application, the terminal device may determine the first contrast ratio between the element and the background region based on the luminance of the element and the luminance of the background region, and adjust the display attribute of the element when the first contrast ratio is less than the preset contrast ratio. Therefore, the display attribute of the element may vary with a display attribute of the background region of the element, so that a probability that a display effect of the element in the background is not prominent due to a decrease in the contrast ratio between the element and the background region may be reduced, thereby improving reading experience of a user.

BRIEF DESCRIPTION OF DRAWINGS

To describe the technical solutions in the embodiments of this application more clearly, the following briefly describes the accompanying drawings required for describing the embodiments. It is clear that the accompanying drawings in the following description show merely some embodiments of this application.

DESCRIPTION OF EMBODIMENTS

Embodiments of this application provide a method for adjusting a display attribute, and a related device, to make a display effect of an element on a page more prominent, thereby improving reading experience of a user.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of this application described herein can be implemented in other orders than the order illustrated or described herein. Moreover, the terms "include", "have", and any other variants mean to cover the non-exclusive inclusion, for example, a process, method, system, product, or device that includes a list of steps or units is not necessarily limited to those units, but may include other units not expressly listed or inherent to such a process, method, system, product, or device.

For ease of understanding, the following first describes an application scenario used in the embodiments of this application.

Figure 1:
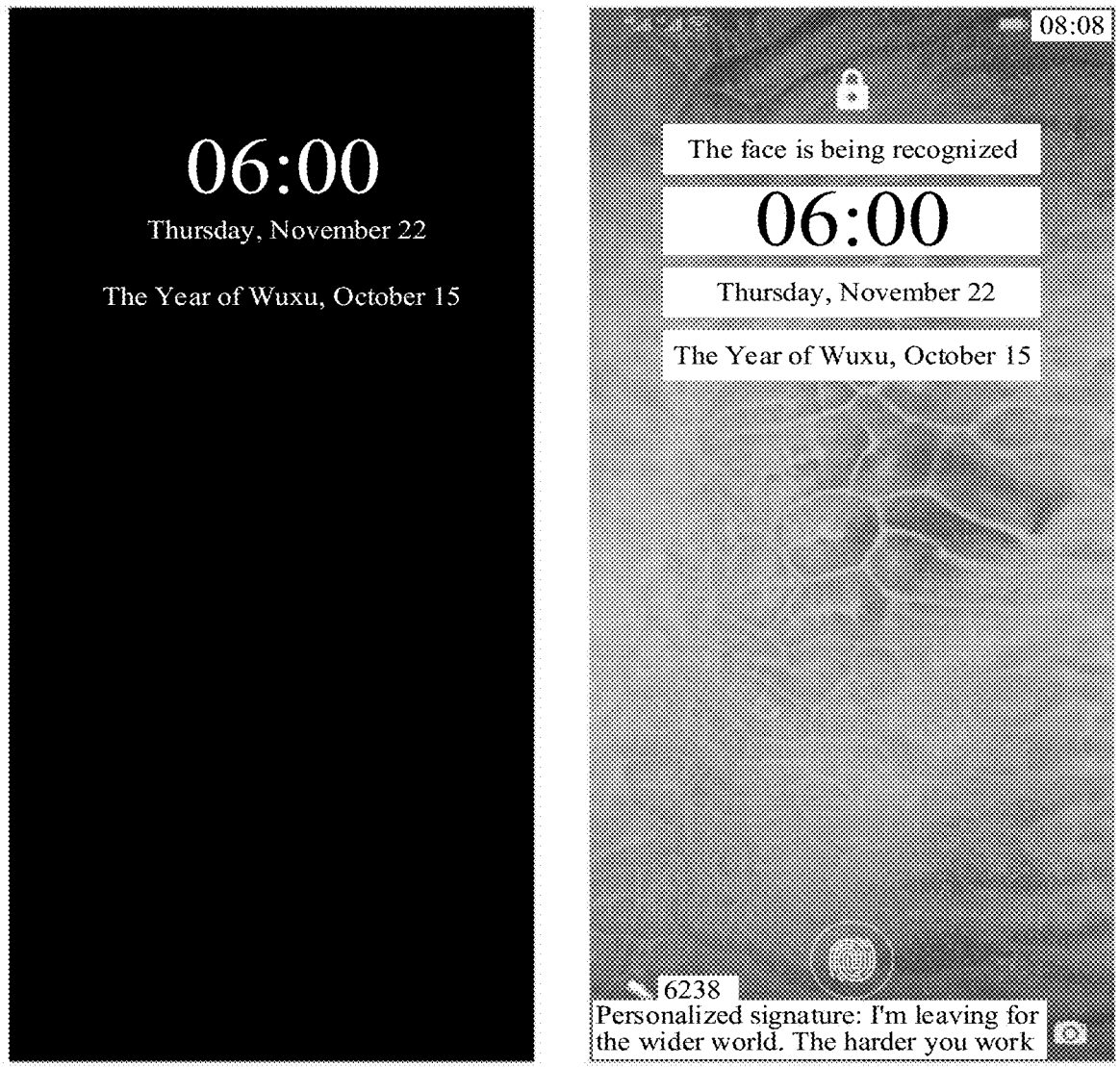
FIG. 1 is a schematic diagram of an application scenario of a method for adjusting a display attribute according to an embodiment of this application.

Generally, a user may set, based on preference of the user, a background of a page displayed by a terminal device. For example, the user may set a screen lock interface. As shown in FIG. 1, the user may switch a background on a left side of FIG. 1 to a background on a right side of FIG. 1. In this process, the user sets only the background of the page, and does not set an element displayed on the page. In this case, a contrast between the background on the right side of FIG. 1 and the element of the page may not be obvious. As a result, the element is not prominently displayed in the background of the page. In this case, the terminal device may adjust the page by using the method provided in an embodiment of this application, so that the element can be prominently displayed on the background while the background set by the user is kept, thereby improving reading experience of the user.

In this embodiment, the terminal device is a device with a display apparatus, and the display apparatus may be a black-and-white display apparatus, or may be a color display apparatus. This is not limited herein. Specifically, the terminal device may be a mobile phone, a tablet computer, or another device with a display apparatus. In this embodiment and subsequent embodiments, only a terminal device is used as an example for description.

Figure 2:
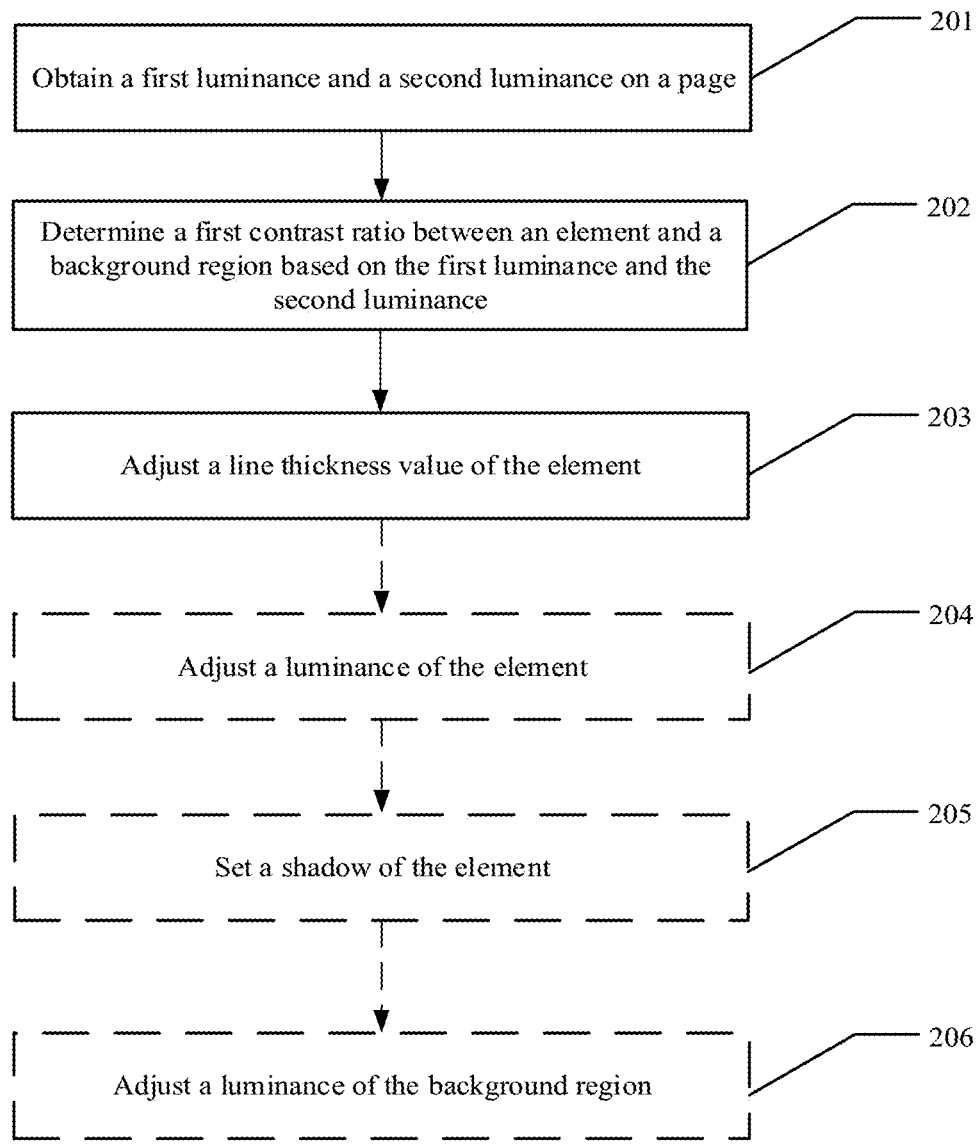
FIG. 2 is a flowchart of a method for adjusting a display attribute according to an embodiment of this application.

For ease of understanding, the following describes, with reference to the foregoing application scenario, a procedure of the method for adjusting a display attribute. Specifically, as shown in FIG. 2, the terminal device performs the following steps.

201. Obtain a first luminance and a second luminance on a page.

Figure 3A:
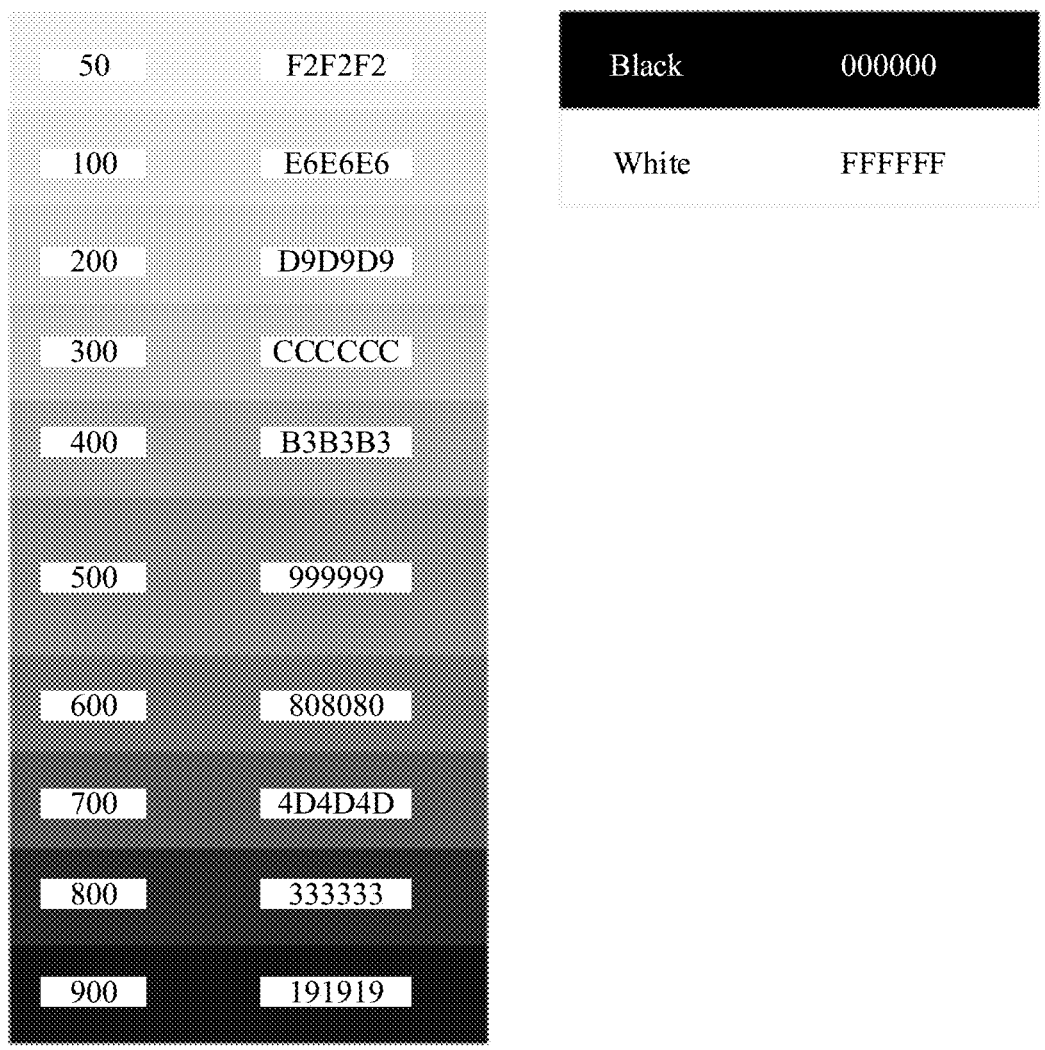
FIG. 3A is a schematic diagram of an embodiment of a method for adjusting a display attribute according to an embodiment of this application.

The first luminance is a luminance of an element on the page. The second luminance is a luminance of a background region in which the element is displayed. The luminance refers to a degree of brightness and darkness of the page. The luminance is unrelated to a color of the page. Using FIG. 3A as an example, in the figure, the luminance is divided into 12 levels, which gradually become darker from 50 to 900. When the darkest level is reached, the region is displayed as black, and when the brightest level is reached, the region is displayed as white. In actual application, if the terminal device divides the luminance into the 12 levels shown in FIG. 3A, the first luminance and the second luminance may fall into one or two levels of the 12 levels. Certainly, due to a difference in actual application requirements, the terminal device may alternatively divide the luminance into more levels. This is not specifically limited herein.

Figure 3B:
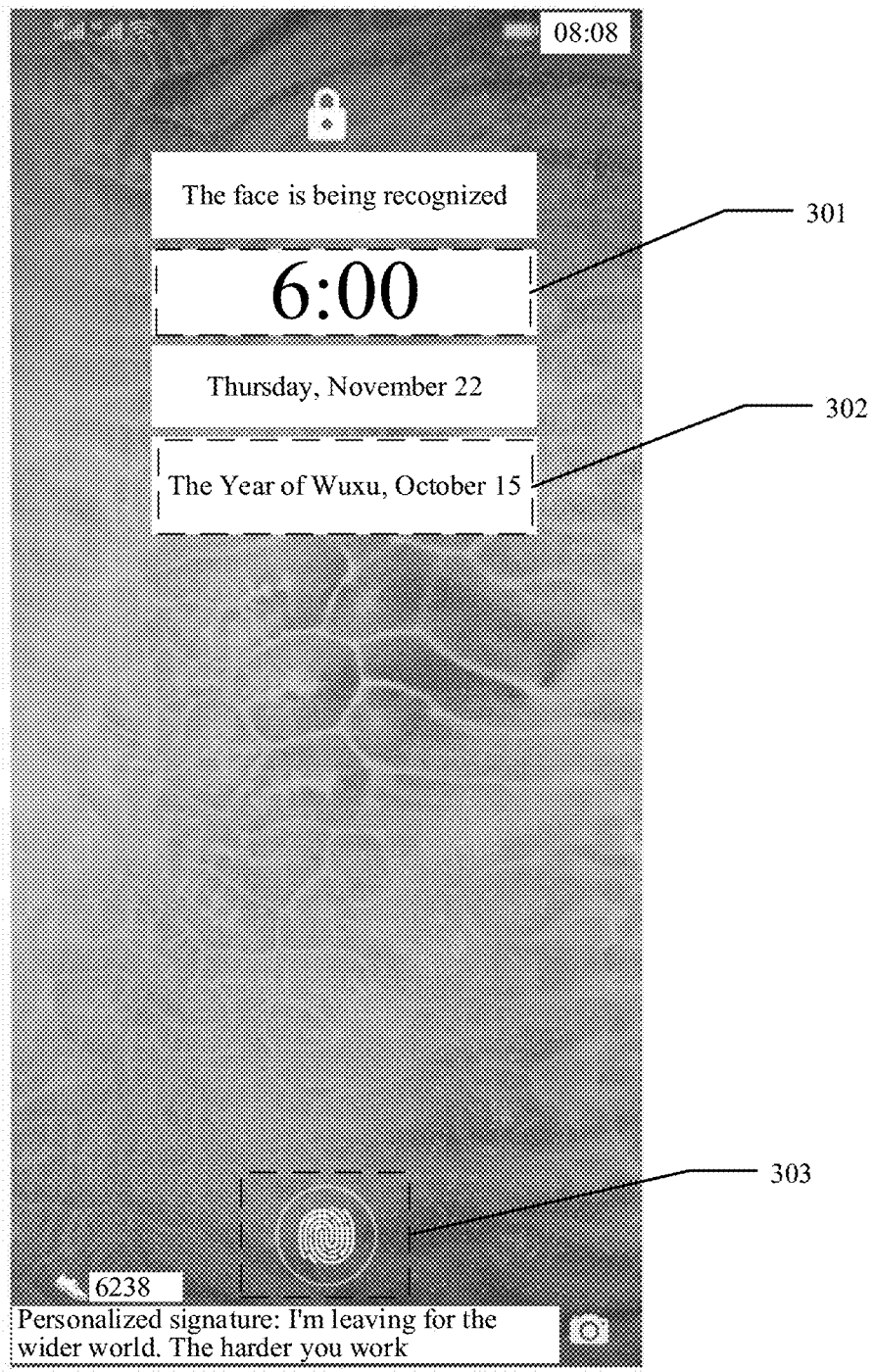
FIG. 3B is a schematic diagram of another embodiment of a method for adjusting a display attribute according to an embodiment of this application.

In addition, the element includes a text or an icon. For ease of understanding, the following provides description with reference to FIG. 3B. As shown in FIG. 3B, the element may be a text, for example, numbers shown in 301 and Chinese characters shown in 302. The element may alternatively be an icon, for example, an icon that represents a fingerprint shown in 303. In actual application, the element may alternatively be another text or icon. This is not specifically limited herein.

Specifically, a region shown in 301 in FIG. 3B is used as an example. "06:00" in the dashed line region shown in 301 is the element, and a luminance of pixels of strokes that display "06:00" is the first luminance. A luminance of pixels other than "06:00" in the dashed line region shown in 301 is the second luminance.

In this embodiment, after the terminal device obtains the first luminance and the second luminance, the terminal device performs step 202.

202. Determine a first contrast ratio between the element and the background region based on the first luminance and the second luminance.

In this embodiment, after obtaining the first luminance and the second luminance, the terminal device may determine the first contrast ratio between the element and the background region based on the first luminance and the second luminance. The contrast ratio refers to a difference in different brightness levels between brightest white and darkest black in bright and dark regions on the page. A larger difference indicates a larger contrast ratio, and a smaller difference indicates a smaller contrast.

Specifically, the terminal device may calculate the first contrast ratio by using a plurality of algorithms. This is not specifically limited herein. In this embodiment and subsequent embodiments, the first contrast ratio is determined by a ratio between luminances. For ease of understanding, the following provides description with reference to a specific example. Assuming that a value of the first luminance is less than that of the second luminance, in this case, the terminal device may calculate a ratio of the value of the second luminance to the value of the first luminance, to obtain the first contrast ratio. In this case, the terminal device may compare the first contrast ratio with a preset contrast ratio. The preset contrast ratio may be a contrast ratio preset during production of the terminal device, or may be a contrast ratio set by a user based on a use habit. This is not specifically limited herein. Generally, the preset contrast ratio may be set to 4.5:1. When the first contrast ratio is less than the preset contrast ratio, the terminal device performs step 203.

203. Adjust a line thickness value of the element.

In this embodiment, the display attribute of the element includes the line thickness value of the element. Generally, a larger line thickness value indicates a thicker line.

Figure 3C:
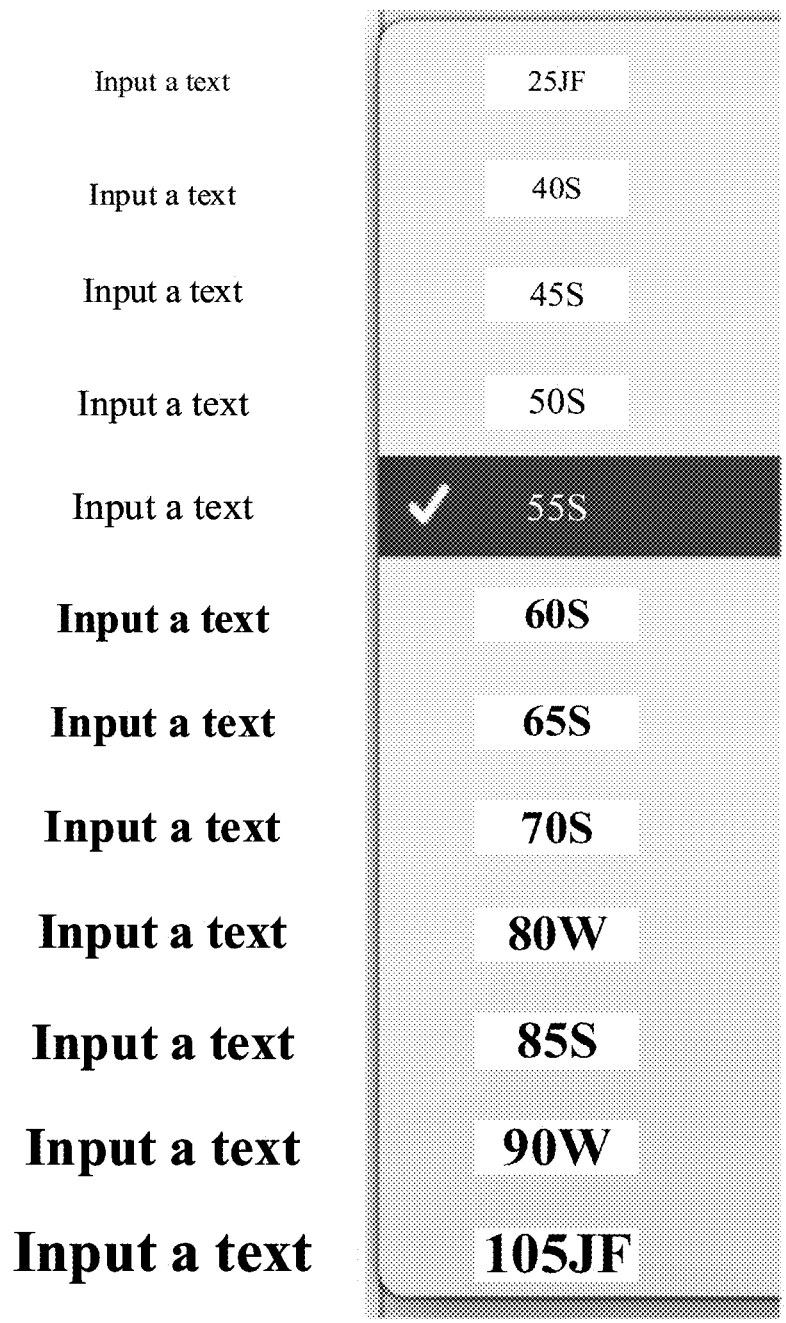
FIG. 3C is a schematic diagram of another embodiment of a method for adjusting a display attribute according to an embodiment of this application.

Specifically, when the element is a text, the line thickness value of the element indicates a thickness of a stroke of the text. For example, a text shown in FIG. 3C may be divided into a total of 12 values: 25 JF to 105 JF.

Figure 3D:
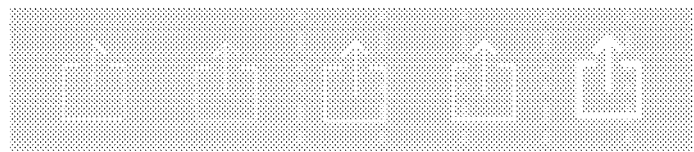
FIG. 3D is a schematic diagram of another embodiment of a method for adjusting a display attribute according to an embodiment of this application.

In addition, when the element is an icon, the line thickness value of the element indicates a line thickness of the icon. For example, a thickness value of an icon shown in FIG. 3D constantly increases from left to right, and a line thickness of the icon also constantly increases.

In this embodiment, when the first contrast ratio is less than the preset contrast ratio, the terminal device may adjust the line thickness value of the element. Specifically, the terminal device may adjust the line thickness value of the element based on a preset correspondence and the first contrast ratio, where the preset correspondence is a correspondence between the first contrast ratio and the line thickness value of the element. More specifically, the terminal device may determine, based on a difference between the preset contrast ratio and the first contrast ratio, a quantity of thickness levels for adjustment. For ease of understanding, description is provided with reference to an example shown in Table 1.

TABLE 1

|  | Preset contrast ratio | First contrast ratio 1 | Second contrast ratio 2 | Third contrast ratio 3 |
|---|---|---|---|---|
| — | 4.5:1 | 3:1 | 3.5:1 | 4:1 |
| Difference between the preset contrast ratio and the first contrast ratio | — | 1.5 | 1 | 0.5 |
| Quantity of thickness levels for adjustment | — | 3 | 2 | 1 |

When the first contrast ratio is 3:1 and the preset contrast ratio is 4.5:1, because the first contrast ratio is less than the preset contrast ratio, the terminal device may calculate a difference between the preset contrast ratio and the first contrast ratio, and adjust the line thickness value of the element based on a correspondence between the difference and the quantity of thickness levels for adjustment in Table 1. For example, when the difference between the preset contrast ratio and the first contrast ratio is 1.5, the line thickness value of the element is increased by three levels. Assuming that an initial line thickness level of the element is 55S shown in FIG. 3C, a line thickness of the element is adjusted to 70S.

In this embodiment, in addition to adjusting the line thickness value of the element based on the foregoing preset thickness levels, the terminal device may further calculate the thickness value based on the first luminance and the second luminance. For ease of understanding, the following formula is used as an example for description. It is assumed that when the second luminance is the darkest (that is, pure dark), the value of the second luminance is 0; when the second luminance is the brightest (that is, pure white), the value of the second luminance is 1000; and 570 is selected as a median value of the luminance. If preset line thickness values of the element are $S_0$, $S_{1000}$, and $S_{570}$, when the second luminance changes, the line thickness value $s_l$ of the element is as follows:

$$s_l = \begin{cases} s_0 + \dfrac{s_{570} - s_0}{570} l & 0 < l < 570 \\ s_{570} + \dfrac{s_{1000} - s_{570}}{430}(l - 570) & 570 < l < 1000 \end{cases}$$

Specifically, in actual application, the calculation formula may vary with an application scenario. This is not specifically limited herein.

Figure 4A:
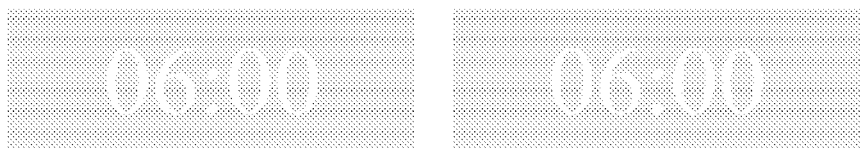
FIG. 4A is a schematic diagram of another embodiment of a method for adjusting a display attribute according to an embodiment of this application.

In this embodiment, for ease of understanding, only the element 301 shown in FIG. 3B is used as an example to display an adjustment effect. After the terminal device adjusts the line thickness value of the element in the foregoing manner, for a display effect of the page, refer to FIG. 4A. A left side of FIG. 4A shows an element whose line thickness value is not adjusted, and a right side of FIG. 4A shows an element whose line thickness value is adjusted. In this case, lines of the element on the page become thicker, so that the user can more easily distinguish, during reading, the element from the background in which the element is displayed. Therefore, reading experience of the user can be appropriately improved.

204. Adjust a luminance of the element.

Step 204 is an optional step, and there is no explicit limitation on a time sequence between step 204 and step 203.

Figure 4B:
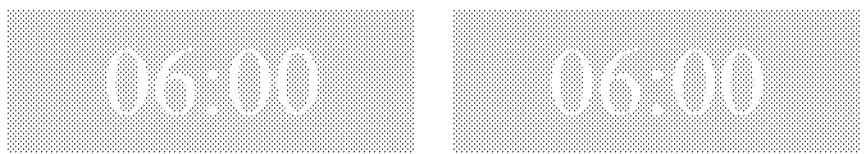
FIG. 4B is a schematic diagram of another embodiment of a method for adjusting a display attribute according to an embodiment of this application.

When the first contrast ratio is less than the preset contrast ratio, the terminal device adjusts the luminance of the element, where the element is a text or an icon. Specifically, the terminal device may adjust the luminance of the element to a first target luminance, where a second contrast ratio between the first target luminance and the luminance of the background region is greater than the preset contrast ratio. For ease of understanding, the following provides description with reference to a specific example. It is assumed that the first luminance is less than the second luminance, the first luminance is 100, and the second luminance is 300. In this case, a ratio of the second luminance to the first luminance is 3:1, which is less than 4.5:1. Therefore, the terminal device adjusts the first luminance to the first target luminance, provided that the first target luminance is less than 100. of understanding, the element 301 shown in FIG. 3B is still used as an example to display an adjustment effect. After the terminal device adjusts the luminance of the element in the foregoing manner, for a display effect of the page, refer to FIG. 4B. A left side of FIG. 4B shows an element whose luminance is not adjusted, and a right side of FIG. 4B shows an element whose luminance is adjusted. In this case, lines of the element on the page become brighter, so that the user can more easily distinguish, during reading, the element from the background in which the element is displayed. Therefore, reading experience of the user can be appropriately improved.

205. Set a shadow of the element.

Step 205 is an optional step, and there is no explicit limitation on a time sequence between step 205 and steps 203 and 204.

Figure 4C:
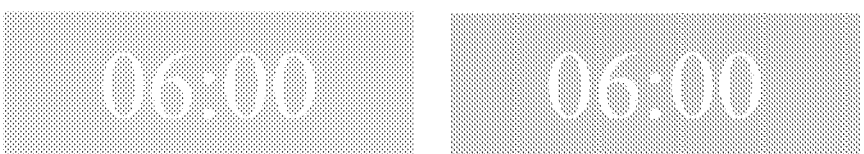
FIG. 4C is a schematic diagram of another embodiment of a method for adjusting a display attribute according to an embodiment of this application.
Figure 4D:
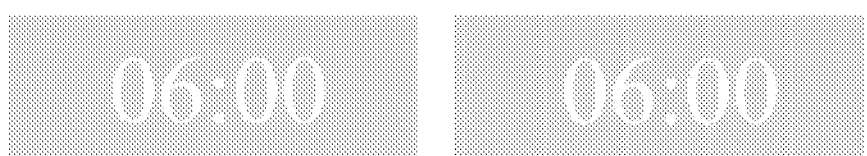
FIG. 4D is a schematic diagram of another embodiment of a method for adjusting a display attribute according to an embodiment of this application.

When the first contrast ratio is less than the preset contrast ratio, the terminal device may set the shadow of the element, where a color of the shadow is different from that of the element. For ease of understanding, in this embodiment, the element 301 shown in FIG. 3B is still used as an example to display an adjustment effect. After the terminal device adjusts the shadow of the element in the foregoing manner, for a display effect of the page, refer to FIG. 4C and FIG. 4D. A left side of FIG. 4C and a left side of FIG. 4D show an element whose shadow is not adjusted. A right side of FIG. 4C shows a scenario in which the shadow overlaps a text. In this case, the shadow forms outer edge lines of the text. A right side of FIG. 4D shows a scenario in which the shadow does not completely overlap the text. In this case, an effect of illuminating the text by a light source on the left side is presented. In actual application, the terminal device may further set another type of shadow effect, to meet preference requirements of different users.

206. Adjust a luminance of the background region.

Step 206 is an optional step, and there is no explicit limitation on a time sequence between step 206 and steps 203 to 205.

In this embodiment, when the first contrast ratio is less than the preset contrast ratio, the terminal device may adjust the luminance of the background region to a second target luminance, where a third contrast ratio between the second target luminance and the luminance of the element is greater than the preset contrast ratio. For ease of understanding, the following provides description with reference to a specific example. It is assumed that the first luminance is less than the second luminance, the first luminance is 100, and the second luminance is 300. In this case, a ratio of the second luminance to the first luminance is 3:1, which is less than 4.5:1. Therefore, the terminal device adjusts the second luminance to a second target luminance, provided that the second target luminance is less than 100.

Figure 4E:
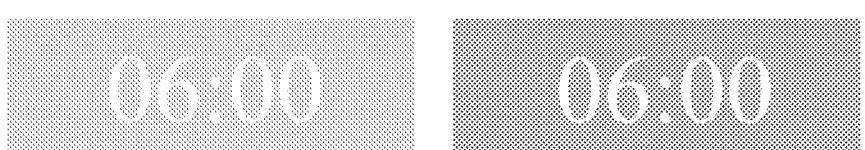
FIG. 4E is a schematic diagram of another embodiment of a method for adjusting a display attribute according to an embodiment of this application.

In this embodiment, the element 301 shown in FIG. 3B is still used as an example to display an adjustment effect. After the terminal device adjusts the luminance of the background region in the foregoing manner, for a display effect of the page, refer to FIG. 4E. A left side of FIG. 4E shows an element that is not adjusted, and a right side of FIG. 4E shows an effect obtained after the luminance of the background region is adjusted. In this case, because the background region becomes darker, lines of the element on the page become brighter, so that the user can more easily distinguish, during reading, the element from the background in which the element is displayed. Therefore, reading experience of the user can be appropriately improved.

Figure 5:
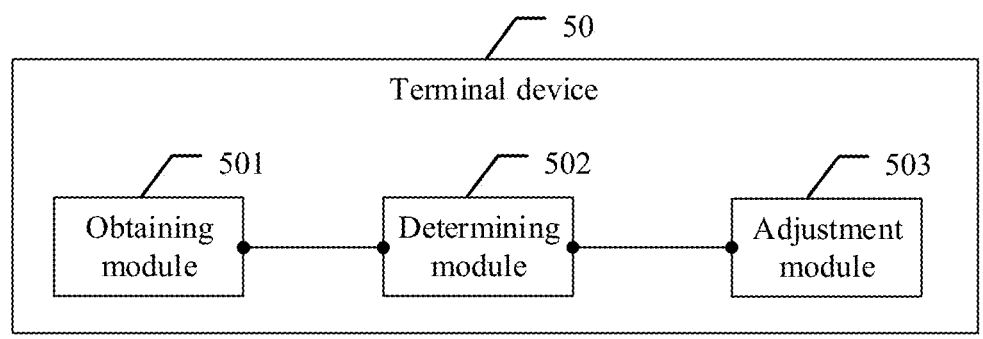
FIG. 5 is a schematic diagram of an embodiment of a terminal device according to an embodiment of this application.

The foregoing describes the method for adjusting a display attribute in this embodiment of this application. The following describes a terminal device used in the method for adjusting a display attribute. Specifically, as shown in FIG. 5, the terminal device 50 includes:

an obtaining module 501, configured to obtain a first luminance and a second luminance on a page, where the first luminance is a luminance of an element on the page, and the second luminance is a luminance of a background region in which the element is displayed;

a determining module 502, configured to determine a first contrast ratio between the element and the background region based on the first luminance and the second luminance; and an adjustment module 503, configured to adjust a display attribute of the element when the first contrast ratio is less than a preset contrast ratio.

In this embodiment of this application, the terminal device may determine the first contrast ratio between the element and the background region based on the luminance of the element and the luminance of the background region, and adjust the display attribute of the element when the first contrast ratio is less than the preset contrast ratio. Therefore, the display attribute of the element may vary with a display attribute of the background region of the element, so that a probability that a display effect of the element in the background is not prominent due to a decrease in the contrast ratio between the element and the background region may be reduced, thereby improving reading experience of a user.

Optionally, the element includes a text or an icon. In this implementation, a specific implementation of the element is specified, which may be a text or may be an icon.

Optionally, the display attribute of the element includes a line thickness value of the element. In this implementation, the display attribute of the element is specified. The terminal device may adjust the line thickness value of the element, so that the element can be displayed on the page relatively prominently.

In a feasible implementation, the adjustment module 503 is specifically configured to adjust a line thickness value of the element based on a preset correspondence and the first contrast ratio, where the preset correspondence is a correspondence between the first contrast ratio and the line thickness value of the element. In this implementation, a specific implementation of adjusting the line thickness value is specified. The terminal device may adjust the line thickness value based on the first contrast ratio, so that the element corresponding to the adjusted line thickness value can be prominently displayed on the page, thereby improving reading experience of a user.

In another feasible implementation, the display attribute of the element further includes the luminance of the element; and the adjustment module 503 is further configured to adjust the luminance of the element to a first target luminance, where a second contrast ratio between the first target luminance and the luminance of the background region is greater than the preset contrast ratio. In this implementation, in addition to adjusting the line thickness value of the element, the terminal device may further adjust the first luminance, that is, adjust the luminance of the element, so that a line of the element can become brighter or darker while becoming thicker.

In another feasible implementation, the display attribute of the element further includes a shadow of the element; and the adjustment module 503 is further configured to set the shadow of the element, where a color of the shadow is different from that of the element. In this implementation, in addition to adjusting the line thickness value of the element and the luminance of the element, the terminal device may further set the shadow for the element, so that the element can be prominently displayed on the page, thereby improving reading experience of a user.

In another feasible implementation, the adjustment module 503 is further configured to adjust the luminance of the background region to a second target luminance, where a third contrast ratio between the second target luminance and the luminance of the element is greater than the preset contrast ratio. In this implementation, in addition to adjusting the line thickness value of the element and the luminance of the element, and setting the shadow, the terminal device may further adjust the luminance of the background region, so that the element can be prominently displayed on the page, thereby improving reading experience of a user.

This embodiment provides a schematic structural diagram of another terminal device 60. The terminal device 60 may be a mobile terminal device with a display apparatus, or may be a chip or a system-on-a-chip in the mobile terminal device.

The terminal device 60 includes a processor 601 and a memory 602. The memory 602 is configured to store programs. The processor 601 is configured to execute the programs in the memory 602, to implement functions of the terminal device in the method embodiments of this application.

The processor 601 may include one or more processors. The memory 602 may include one or more storage media (for example, one or more mass storage devices).

Optionally, the terminal device 60 further includes an input/output interface 603. The input/output interface 603 may be used for communication between the terminal device 60 and another device. Power supply 604 is connected to each of the processor 601, memory 602 and input/output interface 603 to provide suitable power to each of these components.

Figure 6:
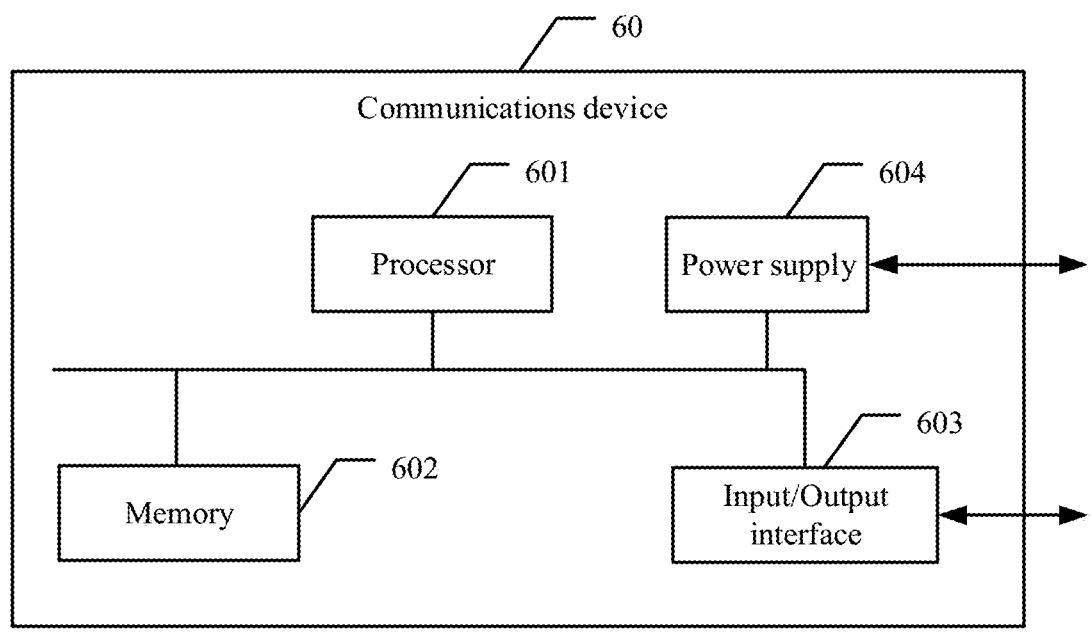
FIG. 6 is a schematic diagram of another embodiment of a terminal device according to an embodiment of this application.

It should be further understood that, in the method embodiment corresponding to FIG. 2, steps performed by the terminal device may be based on the structure of the terminal device 60 shown in FIG. 6.

An embodiment of this application further provides a computer program product including instructions. When the instructions are run on a computer, the computer is enabled to perform functions of the foregoing communications devices.

All or some of the foregoing embodiments may be implemented by using software, hardware, firmware, or any combination thereof. When software is used to implement the embodiments, the embodiments may be implemented completely or partially in a form of a computer program product.

An embodiment of this application provides a computer-readable storage medium. The computer-readable storage medium is configured to store the foregoing instructions, so that the computer can run the instructions to implement functions of the foregoing communications devices.

It may be clearly understood by persons skilled in the art that, for the purpose of convenient and brief description, for a detailed working process of the foregoing system, device, module or unit, refer to a corresponding process in the foregoing method embodiments, and details are not described herein again.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A display method implemented by a terminal device, the display method comprising:

displaying, according to a user-configurable first setting for an interface display, a first interface comprising a first element having a first luminance and a first line thickness value, and a background having a second luminance;

determining a first contrast ratio based on the first luminance and second luminance;

adjusting the line thickness value of the first element when the first contrast ratio is less than a preset contrast ratio by more than a predetermined value, the adjusting being in discrete levels in accordance with a predetermined arrangement of levels and differences in ratios between first and preset contrast values;

adjusting the luminance of the first element when the first contrast ratio is less than the preset contrast ratio; and displaying, according to a user-configurable second setting for the interface display, a second interface comprising a second background having a third luminance and a second text element having a fourth luminance and a second line thickness.

2. The display method of claim 1, wherein:
the second luminance is brighter than the fourth luminance;
the second line thickness is bigger than the first line thickness; and
the first luminance is darker than the third luminance.

3. The display method of claim 1, further comprising:
displaying a first shadow for the first element in the first interface, wherein a first color of the first shadow is different from a second color of the first element; or
displaying a second shadow for the second element in the second interface, wherein a third color of the second shadow is different from a fourth color of the second element.

4. The display method of claim 1 further comprising displaying the first interface and the second interface while the terminal device is locked.

5. The display method of claim 1, further comprising displaying a first shadow for the first element in the first interface, wherein a first color of the first shadow is different from a second color of the first element.

6. The display method of claim 5, further comprising displaying the first interface and the second interface while the terminal device is locked.

7. The display method of claim 1, further comprising displaying a second shadow for the second element in the second interface, wherein a third color of the second shadow is different from a fourth color of the second element.

8. The display method of claim 7, further comprising displaying the second interface while the terminal device is locked.

9. The display method of claim 1, wherein when the value of the first luminance is 0, luminance of the first element is pure dark.

10. An electronic device, comprising:
one or more processors; and
one or more memories coupled to the one or more processors and configured to store instructions that, when executed by the one or more processors, cause the electronic device to:
display, according to a user-configurable first setting for an interface display, a first interface comprising a first element having a first line thickness value, and a background having a second luminance;
determining a first contrast ratio based on the first luminance and second luminance;
adjust the line thickness value of the first element when the first contrast ratio is less than a preset contrast ratio by more than a predetermined value, the adjusting being in discrete levels in accordance with a predetermined arrangement of levels and differences in ratios between first and preset contrast values;
adjusting the luminance of the first element when the first contrast ratio is less than the preset contrast ratio; and
display, according to a user-configurable second setting for the interface display, a second interface comprising a second background having a third luminance and a second text having a fourth luminance and a second line thickness.

11. The electronic device of claim 10, wherein the instructions, when executed by the one or more processors, further cause the electronic device to:
display the second luminance brighter than the fourth luminance;
display the second line thickness bigger than the first line thickness; and
display the first luminance darker than the third luminance.

12. The electronic device of claim 11, wherein when the value of the first luminance is 0, luminance of the first element is pure dark.

13. The electronic device of claim 10, wherein the instructions, when executed by the one or more processors, further cause the electronic device to:
display a first shadow for the first text in the first interface, wherein a first color of the first shadow is different from a second color of the first element; or
display a second shadow for the second text in the second interface, wherein a third color of the second shadow is different from a fourth color of the second element.

14. The electronic device of claim 13, wherein the instructions, when executed by the one or more processors, further cause the electronic device to display a first shadow for the first element in the first interface, and wherein a first color of the first shadow is different from a second color of the first element.

15. The electronic device of claim 14, wherein the instructions, when executed by the one or more processors, further cause the electronic device to display a second shadow for the second element in the second interface, and a third color of the second shadow is different from a fourth color of the second element.

16. The electronic device according to claim 13, wherein the instructions, when executed by the one or more processors, further cause the electronic device to display the first interface and the second interface while the terminal device is locked.

17. The electronic device according to claim 10, wherein the instructions, when executed by the one or more processors, further cause the electronic device to display the first interface and the second interface while the terminal device is locked.

18. A computer program product comprising computer-executable instructions that are stored on a non-transitory computer-readable medium and that, when executed by one or more processors, cause an electronic device to:
display, according to a user-configurable first setting for an interface display, a first interface comprising a first element having a first line thickness value and a background having a second luminance;
determine a first contrast ratio based on the first luminance and second luminance;
adjust the line thickness value of the first element when the first contrast ratio is less than a preset contrast ratio by more than a predetermined value, the adjusting being in discrete levels in accordance with a predetermined arrangement of levels and differences in ratios between first and preset contrast values;
adjusting the luminance of the first element when the first contrast ratio is less than the preset contrast ratio; and
display, according to a user-configurable second setting for an interface display, a second interface comprising a second background having a third luminance and a second element having a fourth luminance and a second line thickness.

19. The computer program product of claim 18, wherein the computer-executable instructions, when executed by the one or more processors, further cause the electronic device to:
- display the second luminance brighter than the fourth luminance;
- display the second line thickness bigger than the first line thickness; and
- display the first luminance darker than the third luminance.

20. The computer program product of claim 19, wherein the computer-executable instructions, when executed by the one or more processors, further cause the electronic device to:
- display a first shadow for the first element in the first interface, wherein a first color of the first shadow is different from a second color of the first element; or
- display a second shadow for the second element in the second interface, wherein a third color of the second shadow is different from a fourth color of the second element.

21. The computer program product of claim 20, wherein the computer-executable instructions, when executed by the one or more processors, further cause the electronic device to display the first interface and the second interface while the terminal device is locked.

22. The computer program product of claim 18, wherein the computer-executable instructions, when executed by the one or more processors, further cause the electronic device to display the first interface and the second interface while the terminal device is locked.

23. The computer program product of claim 18, wherein when the value of the first luminance is 0, luminance of the first element is pure dark.

* * * * *